(12) United States Patent
Papadopoulos et al.

(10) Patent No.: US 10,919,642 B2
(45) Date of Patent: Feb. 16, 2021

(54) HYDRAULIC ACTUATOR AND ACCUMULATOR ARRANGEMENT

(71) Applicant: AIRBUS OPERATIONS LIMITED, Bristol (GB)

(72) Inventors: Christopher Papadopoulos, Bristol (GB); Matthew Marples, Bristol (GB); Andy Mounty, Bristol (GB); Costas Fanourakis, Bristol (GB); Graham King, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 375 days.

(21) Appl. No.: 15/888,120

(22) Filed: Feb. 5, 2018

(65) Prior Publication Data

US 2018/0222599 A1 Aug. 9, 2018

(30) Foreign Application Priority Data

Feb. 6, 2017 (GR) .............................. 20170100052

(51) Int. Cl.
| | |
|---|---|
| *B64D 45/00* | (2006.01) |
| *B64C 25/22* | (2006.01) |
| *B64C 25/34* | (2006.01) |
| *F15B 15/14* | (2006.01) |
| *F15B 19/00* | (2006.01) |

(Continued)

(52) U.S. Cl.
CPC .......... *B64D 45/0005* (2013.01); *B64C 13/48* (2013.01); *B64C 25/22* (2013.01); *B64C 25/34* (2013.01); *B64C 25/58* (2013.01); *B64D 45/00* (2013.01); *B64F 5/60* (2017.01); *F15B 1/08* (2013.01); *F15B 1/24* (2013.01); *F15B 15/14* (2013.01); *F15B 19/00* (2013.01);

(Continued)

(58) Field of Classification Search
CPC ....... B64C 13/48; B64C 27/001; B64C 25/22; B64C 25/34; F15B 1/24; F15B 15/14; B64D 45/0005; B64D 45/00; B64D 45/04
See application file for complete search history.

(56) References Cited

U.S. PATENT DOCUMENTS

| | | | |
|---|---|---|---|
| 4,742,998 A * | 5/1988 | Schubert ............... | B64C 27/001 137/807 |
| 6,652,039 B1 * | 11/2003 | Shull ...................... | B60T 8/404 303/113.2 |

(Continued)

OTHER PUBLICATIONS

UK Search Report for GB 1703808.4 dated Aug. 30, 2017.

*Primary Examiner* — Hoi C Lau
(74) *Attorney, Agent, or Firm* — Nixon & Vanderhye P.C.

(57) ABSTRACT

A landing gear system for an aircraft includes a retractable landing gear assembly, a hydraulic actuator for actuating movement part, for example a bogie of the landing gear assembly, and an accumulator associated with the actuator. The accumulator comprises a volume of pressurised gas separated from hydraulic fluid by a separator piston. Travel of the separator piston beyond a certain position is indicative of a fault. The accumulator includes a snubbing device that acts to slow movement of the separator piston beyond that position. A monitoring system measures the time taken for the movement of the landing gear part effected by the hydraulic actuator. If the measured time is longer than a threshold time, that is indicative of a possible fault in the accumulator, that might, without the snubbing, remain undetected and/or hidden from view.

20 Claims, 7 Drawing Sheets

(51) Int. Cl.
  *B64F 5/60* (2017.01)
  *F15B 1/24* (2006.01)
  *B64C 25/58* (2006.01)
  *B64C 13/48* (2006.01)
  *F15B 1/08* (2006.01)

(52) U.S. Cl.
  CPC .... *F15B 19/005* (2013.01); *B64D 2045/0085* (2013.01); *F15B 2201/205* (2013.01); *F15B 2201/31* (2013.01); *F15B 2211/7051* (2013.01); *F15B 2211/857* (2013.01)

(56) References Cited

U.S. PATENT DOCUMENTS

| | | | |
|---|---|---|---|
| 10,467,881 B2* | 11/2019 | Chen | G01F 17/00 |
| 2010/0313689 A1* | 12/2010 | Quenerch'du | F15B 15/14 |
| | | | 74/89.39 |
| 2012/0041639 A1 | 2/2012 | Followell et al. | |
| 2014/0033909 A1* | 2/2014 | Murphy | F15B 15/28 |
| | | | 91/27 |
| 2014/0137680 A1 | 5/2014 | Leglize | |
| 2015/0007651 A1* | 1/2015 | Reyes, III | E21B 34/16 |
| | | | 73/152.51 |
| 2015/0217747 A1* | 8/2015 | Cahill | B60T 17/221 |
| | | | 701/70 |
| 2017/0069145 A1* | 3/2017 | Dorkel | G05B 23/0254 |
| 2017/0349296 A1* | 12/2017 | Moy | B64C 3/56 |
| 2018/0222599 A1* | 8/2018 | Papadopoulos | B64C 13/48 |
| 2019/0063175 A1* | 2/2019 | Papadimitriou | E21B 41/0007 |
| 2019/0228637 A1* | 7/2019 | Chen | F15B 1/24 |
| 2019/0248478 A1* | 8/2019 | Crane | B64F 5/60 |

* cited by examiner

HYDRAULIC ACTUATOR AND ACCUMULATOR ARRANGEMENT

RELATED APPLICATIONS

The present application claims priority to Greece Application Number 20170100052, filed Feb. 6, 2017, the disclosure of which is hereby incorporated by reference herein in its entirety.

BACKGROUND OF THE INVENTION

The present invention concerns a hydraulic actuator and accumulator arrangement, particularly but not exclusively, when provided on an aircraft landing gear assembly. The invention also concerns a method of detecting a fault in an accumulator.

Embodiments of the present invention concern retraction of a landing gear assembly of an aircraft, wherein the assembly comprises a bogie. The retraction includes using an accumulator-energised hydraulic actuator to position the bogie into a bias position that is determined by the geometry of the gear/actuator and accumulator design. The accumulator comprises a volume of pressurised gas that is separated from hydraulic fluid by a separator piston. Such a separator piston has the potential for hidden failure. For example, if there is leakage of fluid/gas from one side of the separator piston to the other, the separator piston may during use travel beyond its normal range of positions in the accumulator. In certain cases of failure, the separator piston may bottom-out, in that further movement of the separator piston in a given direction is physically prevented by the internal structure of the accumulator. That in turn may disrupt timely and/or correct positioning of the bogie of the landing gear. When the interior of the accumulator is not readily visible there may be no convenient means for ascertaining the condition of the separator piston, other than via manual inspection during a time-consuming servicing operation. It may be possible that a bogie may be adequately well positioned during use, despite there being a minor fault in the piston. Thus, such minor faults may remain undetected. Such minor faults do not adversely affect day-to-day operations, for as long as the fault remains minor. Such faults tend to get worse with time, however. It is of course desirous to detect any faults that develop with an accumulator sufficiently early that repair or replacement may be made before the fault worsens to the extent that the correct and timely positioning of the bogie is significantly adversely affected. One solution available presently is to increase the frequency of manual inspections of the accumulator, with the consequent labour and time costs.

Another solution for monitoring unwanted drift of the separator piston is to associate the piston with a displacement sensor, which allows detection of its position by means of sensors outside the actuator/accumulator housing. This would however require further electronics to be associated with the actuator.

The present invention seeks to mitigate one or more of the above-mentioned problems. Alternatively or additionally, the present invention seeks to provide an improved hydraulic actuator and accumulator arrangement for an aircraft landing gear assembly. Alternatively or additionally, the present invention seeks to provide a means for early detection of a fault with such a hydraulic actuator and/or accumulator arrangement.

SUMMARY OF THE INVENTION

The present invention provides, according to a first aspect of the invention, a landing gear system for an aircraft including a retractable landing gear assembly, a hydraulic actuator for actuating movement of at least a part of the landing gear assembly from a first configuration to a second configuration, and an accumulator associated with the actuator, the accumulator comprising a volume of pressurised gas that is separated from hydraulic fluid by a separator piston. The separator piston may be in the form of a diaphragm for example. The separator piston is configured, during normal fault-free use for example, to travel to a first stroke limit position during the movement of the part from the first configuration to the second configuration. It may therefore be that travel of the separator piston beyond the first stroke limit position is indicative of a fault. The accumulator includes a snubbing device that acts to slow movement of the separator piston beyond the first stroke limit position, so that the time taken for the movement of the part of the landing gear assembly from the first configuration to the second configuration can be used as a predictor of whether or not there might be a fault. Thus, there is also a monitoring system which is arranged to measure the time taken for movement of the part of the landing gear assembly from the first configuration to the second configuration. The time taken may then be compared with a threshold time, for example to test for a possible fault. In embodiments of the invention, when the measured time is longer than the threshold time that is deemed to be indicative of a possible fault in the accumulator. The comparison may comprise checking whether the difference between a measured time and an expected time is greater than a pre-set limit. The landing gear monitoring system may be configured to output an alert signal, in the event that a possible fault is detected. Such an alert signal may simply be the setting of a flag (in computer memory of some form for example) that may then alert ground crew of the need to inspect the accumulator during the next planned ground maintenance operation. The alert signal may alternatively or additionally trigger the operation of a warning light. The alert signal may alternatively or additionally trigger the output of a warning message. The snubbing device may act to slow movement of the separator piston only once the separator piston has traveled beyond the first stroke limit position.

In embodiments of the present invention, ground crew may be provided with an early alert of the possibility of an accumulator failure mode, without the need for a displacement sensor. Thus, there may consequently be a reduced risk of a hidden failure mode suddenly manifesting itself in a time frame that does not allow for reactive maintenance to recover the situation in a cost-efficient manner Additionally or alternatively, design and/or operating costs may be reduced.

It will be appreciated that the accumulator and/or the actuator may be provided separately from the gas/hydraulic fluid that would normally be accommodated therein during use. It will be appreciated that in such a case the skilled person will recognise that the accumulator comprises a first space for a volume of pressurised gas and a second space for a volume of hydraulic fluid, the first and second spaces being separated by a separator piston.

The hydraulic actuator may be configured for moving a bogie of the landing gear assembly. In an embodiment of the invention, the hydraulic actuator is configured to position a bogie into a bias position. In such a case the second configuration mentioned above may be considered as equivalent to the bias position. The hydraulic actuator may for example be in the form of a bogie pitch trimmer actuator. In the case where the hydraulic actuator is provided for moving a landing gear bogie, the monitoring system may be provided by a bogie pitch monitoring system (for example the monitoring system being in the form of, or provided as part of, such a bogie pitch monitoring system). Such a bogie pitch monitoring system may be arranged to detect when the bogie is moved to/from a prior pre-set state and/or when the bogie is moved to/from the bias position. The bogie pitch monitoring system may be arranged to measure the time taken for the bogie to be moved from a prior pre-set state to the bias position. The prior pre-set state of the bogie may for example be that position adopted by the bogie immediately after take-off (before the landing gear assembly is to be retracted). The prior pre-set state of the bogie may for example be that position adopted by the bogie immediately before it starts moving relative to the landing gear assembly, during retraction of the landing gear assembly.

The monitoring system may alternatively, or additionally, be provided by a landing gear monitoring system (for example the monitoring system being in the form of, or provided as part of, such a landing gear monitoring system). The landing gear monitoring system may be arranged to detect when the landing gear assembly moves to/from a deployed configuration and/or may be arranged to detect when the landing gear assembly moves to/from a retracted configuration. The landing gear monitoring system may be arranged to measure the time taken for the landing gear assembly to move between a deployed configuration and a retracted configuration. The landing gear monitoring system may for example be arranged to measure the time taken for the landing gear assembly to move from the deployed configuration to the retracted configuration. The deployed configuration may therefore be the first configuration mentioned above. The retracted configuration may therefore be the second configuration mentioned above.

It may be that the snubbing device is provided at least in part by means of geometrical features of the accumulator. It may be that the snubbing device is provided at least in part by means of a mechanical device, such as a spring mechanism for example, or a damper. It may be that the snubbing device comprises a metered cup system. Such a metered cup system may comprise a cup-to-cup arrangement that constrains the flow of a trapped volume of fluid progressively by restricting flow as the separator piston approaches and/or goes beyond its normal (fault-free) end of stroke position. The snubbing device may comprise multiple parts that are not directly joined together. The snubbing device may comprise two or more snubbing elements that are moveable relative to each other, for example causing a progressive constriction of flow of fluid. The snubbing elements may be moveable from a spaced apart position to a position in which the snubbing elements co-operate with each other to cause a slowing of movement, for example by giving rise to one or more forces that resist further movement in the same direction. Such one or more forces may rise in magnitude as the snubbing elements move further in that same direction. The snubbing device may comprise a snubbing element (for example a protrusion) that extends from the separator piston that cooperates with an aperture (for example in the manner of a closing gate), which may progressively reduce the flow area of an inlet/outlet port of the accumulator.

As mentioned above, the snubbing device acts to slow movement of the separator piston beyond the first stroke limit position. The first stroke limit position may represent the furthest the piston travels in a given direction during normal (fault-free) use. The snubbing device may also act to slow movement of the separator piston as it approaches the first stroke limit position.

The landing gear system may include one or more sensors that are connected to the monitoring system to enable the monitoring system to detect when the landing gear assembly has moved to the second configuration.

The landing gear system may also include one or more sensors (which may be the same as the one or more sensors mentioned immediately above) for enabling the monitoring system to detect when the landing gear assembly has moved to the first configuration. The one or more sensors may be located externally of the accumulator. The one or more sensors may also be located externally of the actuator. For example the sensors may be located on the exterior of one or more parts of the landing gear assembly, including for example on the landing gear leg.

According to a further aspect of the invention there is provided a method of detecting a fault in an accumulator of a hydraulic system associated with a moving part of an aircraft. The method may comprise a step of measuring the time taken for the moving part of the aircraft to move between two positions under operation of the hydraulic system including the accumulator. The method comprises a step of deeming whether or not there might be a fault in the accumulator. This may be performed by comparing the measured time with an expected time. The movement of a part of the accumulator beyond the extreme position that accumulator part would reach during movement without such a fault is snubbed. By snubbing such movement, it may be that the time taken for the movement when a certain fault is present is longer than when there is no such fault, for example, even when the moving part of the aircraft moves all of the way between the two positions. It may be possible for a successful movement of the aircraft part to be achieved with the presence of a fault. In such a case, however, the snubbing feature causes the movement to take longer than in the fault-free case. A fault may therefore be more easily detected (as a result of monitoring the time taken to achieve a given movement). The method may thus include successfully moving the moving aircraft part between the two positons (e.g. from or to a fully deployed position and/or from or to a fully retracted position), despite a fault being present in the accumulator, and nevertheless detecting the fault by means of the comparison between the measured time and the expected time.

The moving part of the aircraft may be a bogie of a landing gear assembly. The part of the accumulator being snubbed may be a separator piston of the accumulator.

According to a yet further aspect of the invention there is provided a kit of parts comprising a hydraulic actuator, a snubbed accumulator, and a monitoring system. The kit of parts may be arranged so as to be suitable for use for converting an aircraft landing gear assembly into a landing gear system in accordance with any aspect of the present invention as claimed or described herein, including any optional features relating thereto. The kit of parts may be arranged so as to be suitable for performing the method in accordance with any aspect of the present invention as claimed or described herein, including any optional features relating thereto.

The invention also provides an aircraft, or part therefor, comprising an apparatus in accordance with any aspect of the present invention as claimed or described herein, including any optional features relating thereto.

The invention also provides a monitoring system for use in any aspect of the present invention as claimed or described herein, including any optional features relating thereto. There may be computer hardware programmed with suitable software for performing the function of the monitoring system of present invention. The present invention thus also provides a computer program product carrying such software. The computer program product may be configured to cause, when the computer program is executed, computer hardware to perform the function of the monitoring system of the invention.

According to a further aspect of the invention there is also provided an accumulator including a snubbing device, wherein the accumulator is configured for use as the snubbed accumulator in accordance with any aspect of the present invention as claimed or described herein, including any optional features relating thereto.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
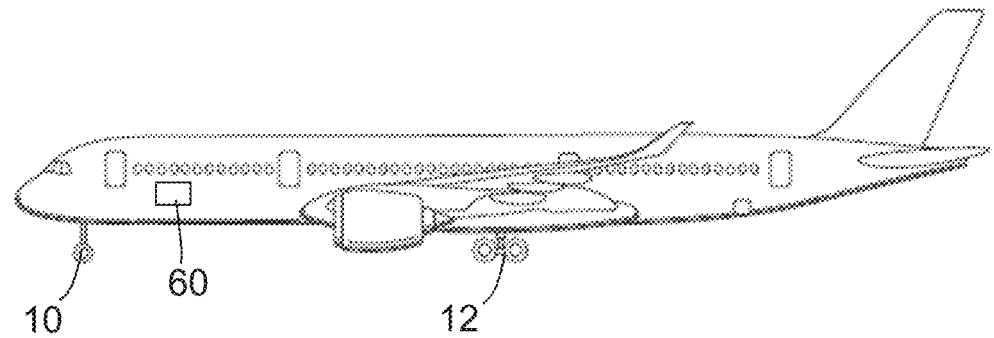
FIG. 1 shows an aircraft according to an embodiment of the invention, the aircraft including a retractable landing gear assembly and associated monitoring system.

The embodiments generally relate to an aircraft landing gear system which includes a monitoring system which is arranged to detect a possible fault in the accumulator of a hydraulic system used to move a part of the landing gear. FIG. 1 shows an aircraft including a nose landing gear assembly 10 (the "NLG" assembly) and a main landing gear assembly 12 (the "MLG" assembly). The MLG assembly 12 includes wheels mounted on a bogie. Both NLG and MLG are retractable into respective landing gear bays on the aircraft. The embodiments concern detecting a failure mode in the accumulator associated with a hydraulically operated pitch trimmer for the bogie on the MLG 12. In the embodiment of FIG. 1, the detection of the failure mode is performed by a monitoring system 60 on the aircraft. The type of failure mode that is detected will now be explained briefly. In bogie pitch trimmer actuators of the prior art, there is the possibility of a progressive dormant failure mode in the accumulator. Such a failure mode may for example occur when the separator piston of the accumulator migrates across towards the accumulator in/out port, as a consequence of surface wetting and seal degradation. If such a migration of the separator piston remains undetected, it can reach the point at which the separator piston bottoms out, resulting in a failure to position the bogie in the bias position. This can result in failure to retract the landing gear fully. A fault in the separator piston positioning in the accumulator, when initially present, may exhibit no significant and easy-to-detect external symptoms of the failure mode. The failure mode can therefore exist and remain undetected, with the fault getting progressively worse with time, up until the point in time at which it is no longer possible to correctly position the bogie, corresponding to the point at which the separator piston bottoms out during operation. If the failure mode were to worsen to this extent there would be a significant risk of the landing gear assembly being unable to be fully retracted into the landing gear bay of the aircraft. The monitoring system 60 of the present embodiment enables early detection of such a failure mode, as a result of a special modification of the end-of-stroke fluid dynamics in the accumulator, which will now be described in further detail.

Figure 2:
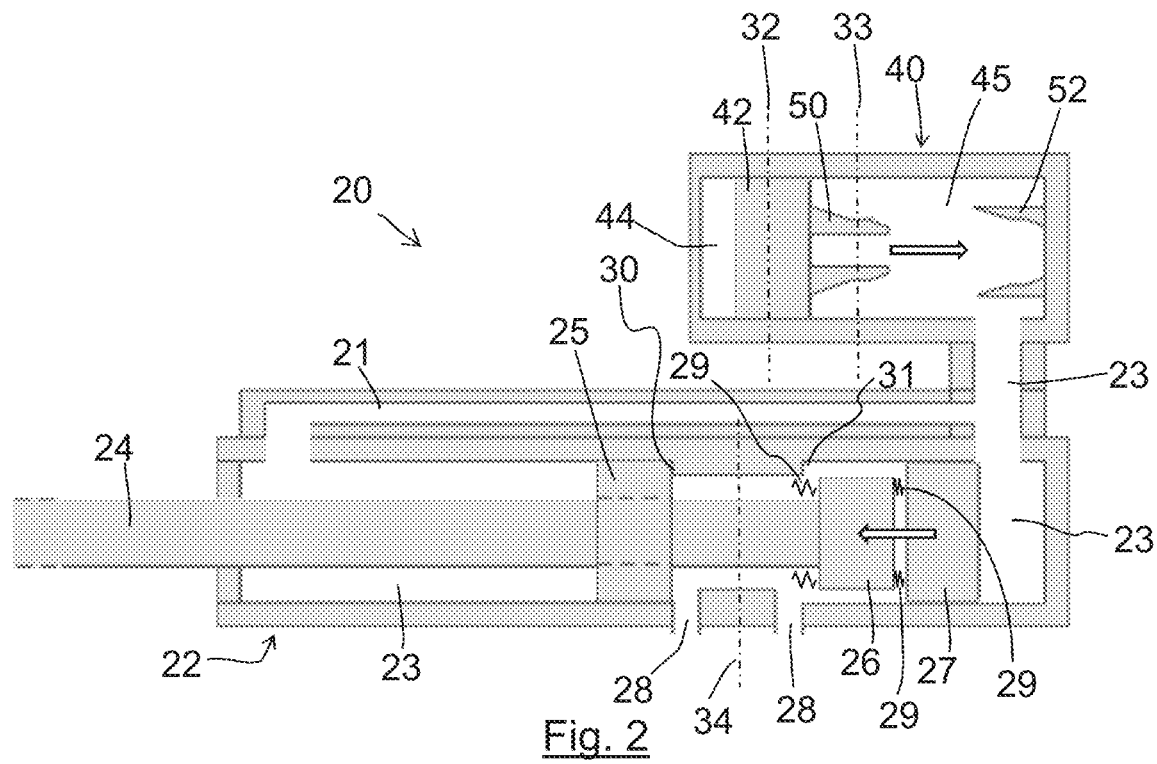
FIG. 2 shows a hydraulic actuator for actuating movement of the bogie of the landing gear assembly of FIG. 1 and an accumulator associated with that actuator.

FIG. 2 shows the bogie pitch trimmer actuator 20, which comprises a hydraulic drive unit 22 associated with an accumulator 40. The actuator 20 is shown in a retracted position in FIG. 2 corresponding to a non-biased position of the bogie. The hydraulic drive unit 22 contains hydraulic fluid 23 and acts in use to drive a rod 24 that is used to trim the pitch of the MLG bogie. The gas-pressurised accumulator 40 provides a local source of pressure and acts to absorb sharp changes in pressure that may be caused by external forces acting on the bogie, for example during landing, take-off and/or retraction of the landing gear. The accumulator 40 thus includes a space 44 for containing a volume of pressurised gas. This space 44 is separated from hydraulic fluid 45 in the accumulator by a separator piston 42. There is fluid communication between the hydraulic fluid 45 in the accumulator 40 and the hydraulic fluid 23 in the hydraulic drive unit 22. The hydraulic drive unit 22 includes a hydraulic fluid circulation passageway 21. The hydraulic drive unit 22 has two independently moveable piston heads, namely a left-hand (as seen in FIG. 2) piston head 25 and a right-hand piston head 27. A section of the rod 24 is accommodated within a passageway formed in the centre of the left-hand piston head 25. The rod cross-section and the passageway are together sized and configured to allow sliding movement of the rod 24 along and relative to the passageway. The rod 24 has a rod head 26 at one end, the rod head being positioned between the two piston heads 25, 27. The area immediately surrounding the rod head 26 is filled with air, and vents to atmosphere via ports 28. The rod head 26 has annular springs 29, both on the left-hand side and the right-hand side, that are configured to engage with the piston heads 25, 27. There is a left-hand stop 30 which stops movement of the left-hand piston head 25 beyond the stop in the right hand direction. There is a right-hand stop 31 which stops movement of the right-hand piston head 27 beyond the stop in the left-hand direction.

In a fault-free condition of the retracted actuator 20, the left-hand piston head 25 abuts the left-hand stop 30, the gas chamber 44 is uncharged, and therefore the separator piston 42 in the accumulator is at its left-most position (during normal operation) and the right-hand piston head 27 is at its right-most position (during normal operation). The rod head 26 of the hydraulic rod 24 abuts the right-hand piston head 27 via springs 29. The position of the mid-line of the separator piston 42 at its left-most position when the bogie pitch trimmer actuator 20 is fully retracted in the fault-free mode is indicated by the dotted line 32. Dotted lines 33 and 34 refer to other/different positions as will be described in more detail below.

The accumulator 40 and the separator piston 42 geometry are each designed to have snubbing features, which in this embodiment are in the form of respective cups 50, 52, which when moved together form a constricted flow-path of the hydraulic fluid and therefore provide a damping effect when the cups cooperate in this way.

Figure 3:
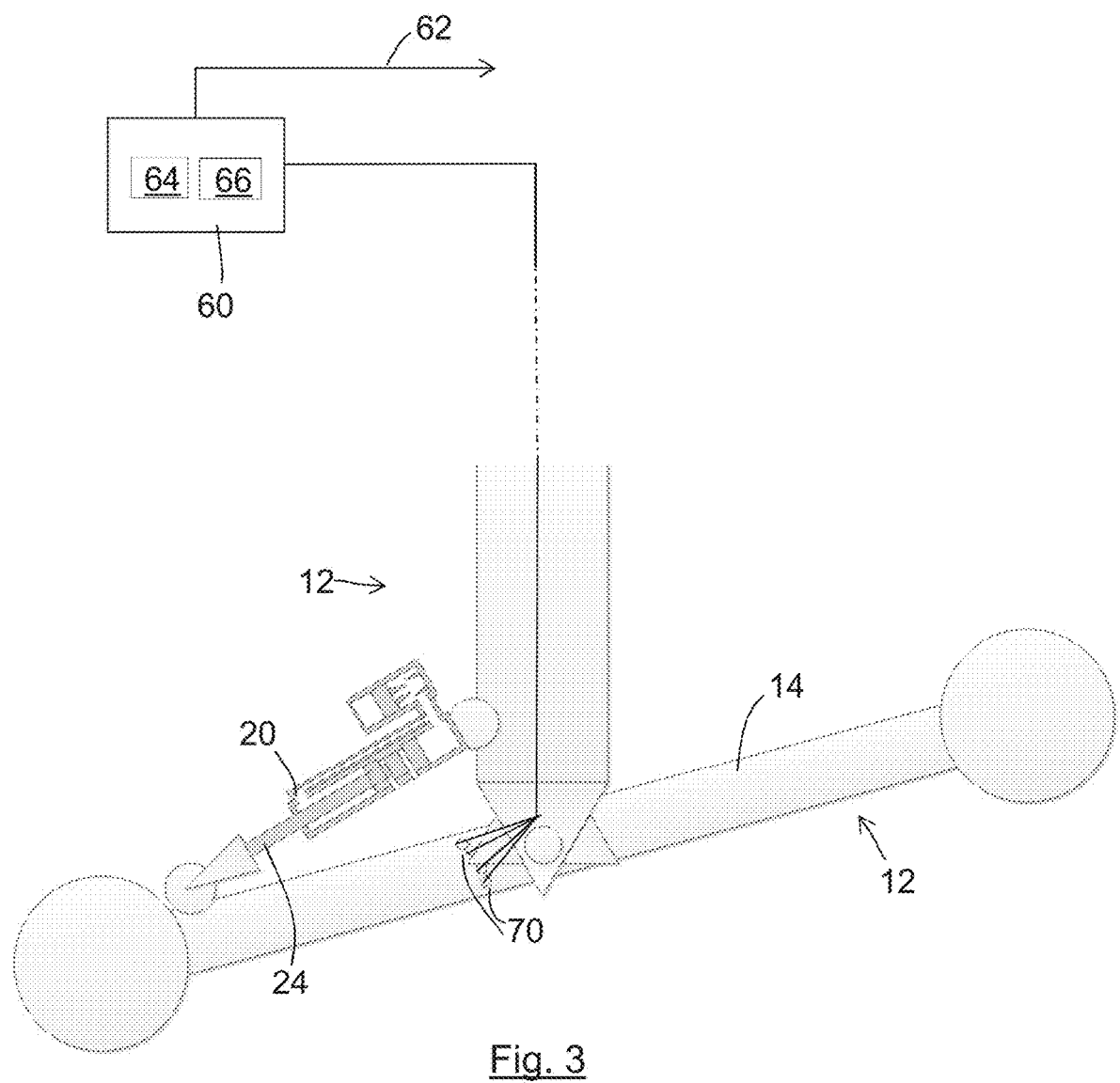
FIG. 3 shows the monitoring system of FIG. 1 and the hydraulic actuator/accumulator arrangement of FIG. 2 in situ on an extended landing gear assembly.

As shown in FIG. 3, in use, the rod 24 of the bogie pitch trimmer actuator 20 may be operated to trim the pitch of a bogie 14 of the MLG 12. As will be explained in further detail below, the bogie pitch trimmer actuator 20 is configured so that in the event of certain types of fault, the cups 50, 52 of the accumulator 40 cooperate to provide a snubbing effect at the end of the movement of the actuator 20 to a given target position. When the bogie pitch trimmer actuator 20 is operating in a fault-free condition, there is no (or negligible) snubbing in the accumulator 40 during the movement of the actuator to the same target position. Thus by measuring the time it takes the bogie pitch trimmer actuator 20 to move from an initial position to a target position, it may be discerned whether there is a fault in the actuator 20. If the time taken is longer than a pre-set threshold amount, there may be a fault. The time is effectively monitored by the monitoring system 60, which in this case is provided as part of a bogie pitch monitoring system on the aircraft. The monitoring system 60 measures the time taken for the bogie pitch to move from an untrimmed neutral (non-biased) position to a trimmed (biased) position ready for retraction. The expected time for this operation to be completed is a time that is of the order of a few seconds.

The monitoring system 60 receives inputs from sensors 70, which are present on the aircraft in any case for use with the bogie pitch trimming function. With the use of a computer processor 64 and clock 66, the monitoring system 60 detects when the actuator has moved from its untrimmed neutral position (which may be considered as an initial position) and when it has reached the final trimmed position (which may be considered as a target position). The monitoring system 60 is arranged to ascertain the time taken for that movement and to compare the measured time with the pre-set threshold. If the measured time is greater than the threshold time, the monitoring system 60 outputs an alert signal 62. The alert signal 62 causes a flag to be set in an electronic maintenance log so that when the aircraft is next inspected by ground crew for maintenance purposes, the ground crew are alerted to the possible fault in the accumulator. Inspection may then be carried out, and repairs carried out if that proves necessary.

Figure 4:
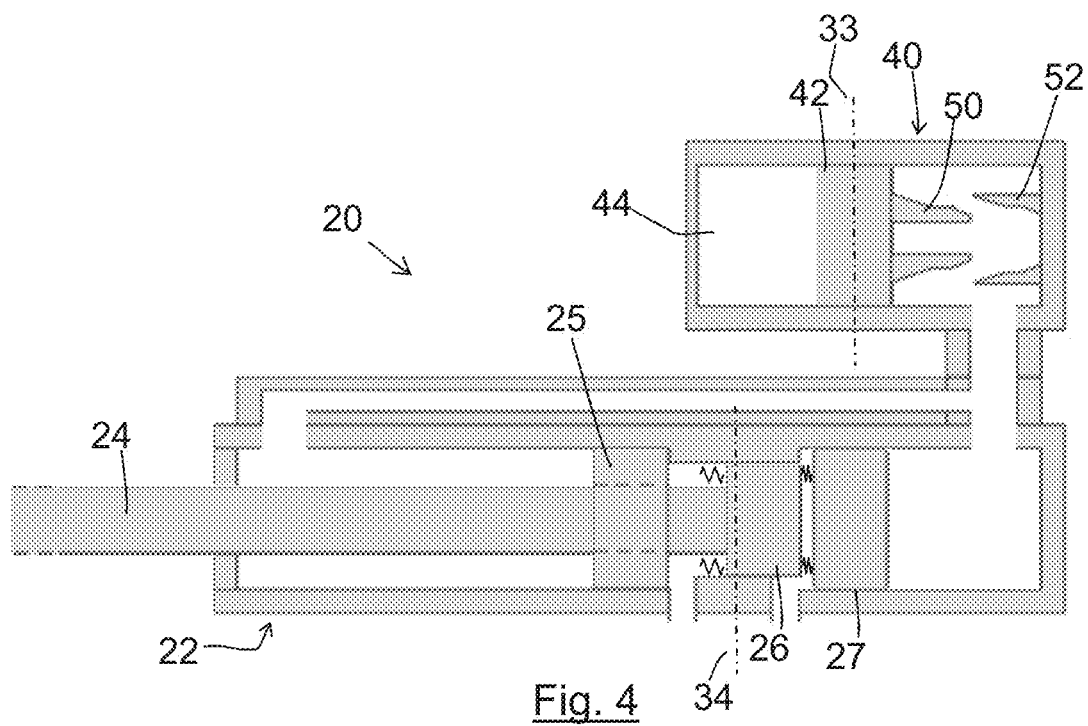
FIGS. 4 to 10 show the hydraulic actuator of FIG. 1 during various modes of operation.
Figure 5:
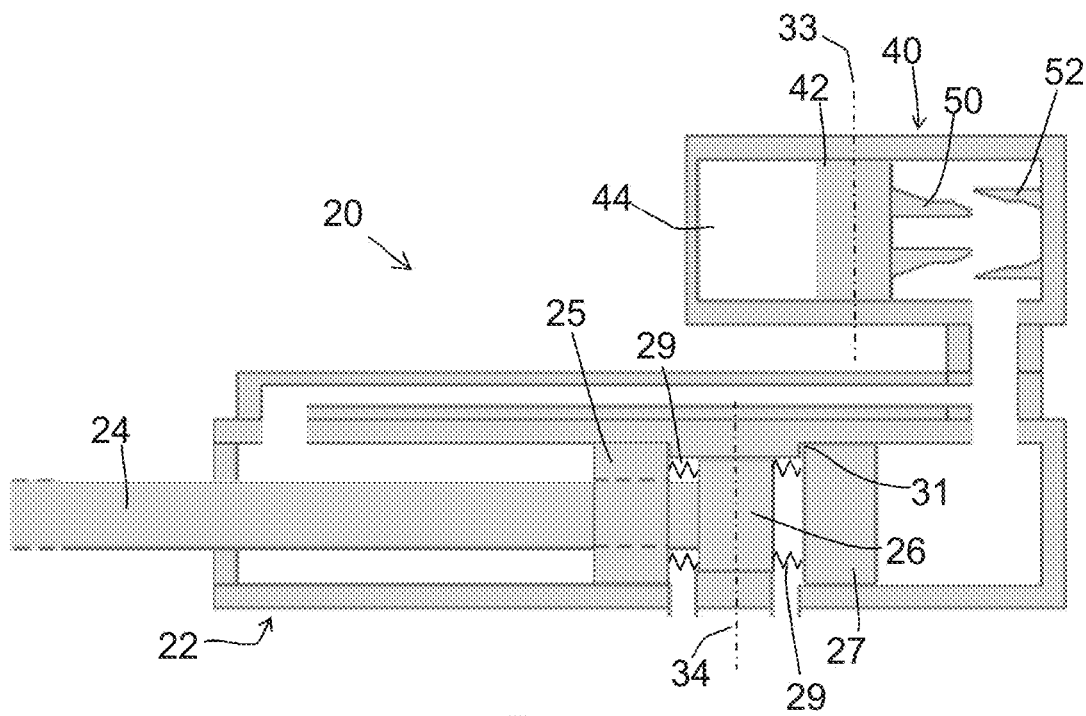

FIGS. 4 and 5 show in greater detail, the actuator 20 reaching its position corresponding to the (fault-free) deployment of the bogie in its biased/trimmed position, thus corresponding to the state illustrated by FIG. 3. FIG. 4 shows the gas chamber 44 charged with gas, which has urged the separator piston 42 in the accumulator to its (fault-free) target position. The position of the mid-line of the separator piston 42 at this position is indicated by the dotted line 33. The movement of the separator piston 42 to the right, causes a corresponding movement of the right-hand piston head 27 to the left, which in turn pushes the rod head 26 and rod 24 to the left. At the bias (target position) the right-hand piston head 27 abuts the right-hand stop 31, as shown in FIG. 5. The rod-head 26 moves, under the action of the springs 29, to be positioned midway between the two piston heads 25, 27 and assumes a bias-position indicated by the dotted line 34 (the mid-line of the rod-head 26 when in this position). The cups 50 and 52 of the accumulator are sufficiently far apart that no snubbing occurs. It will be seen that FIG. 4 shows the position of the actuator 20 shortly before reaching the position shown in FIG. 5.

Figure 6:
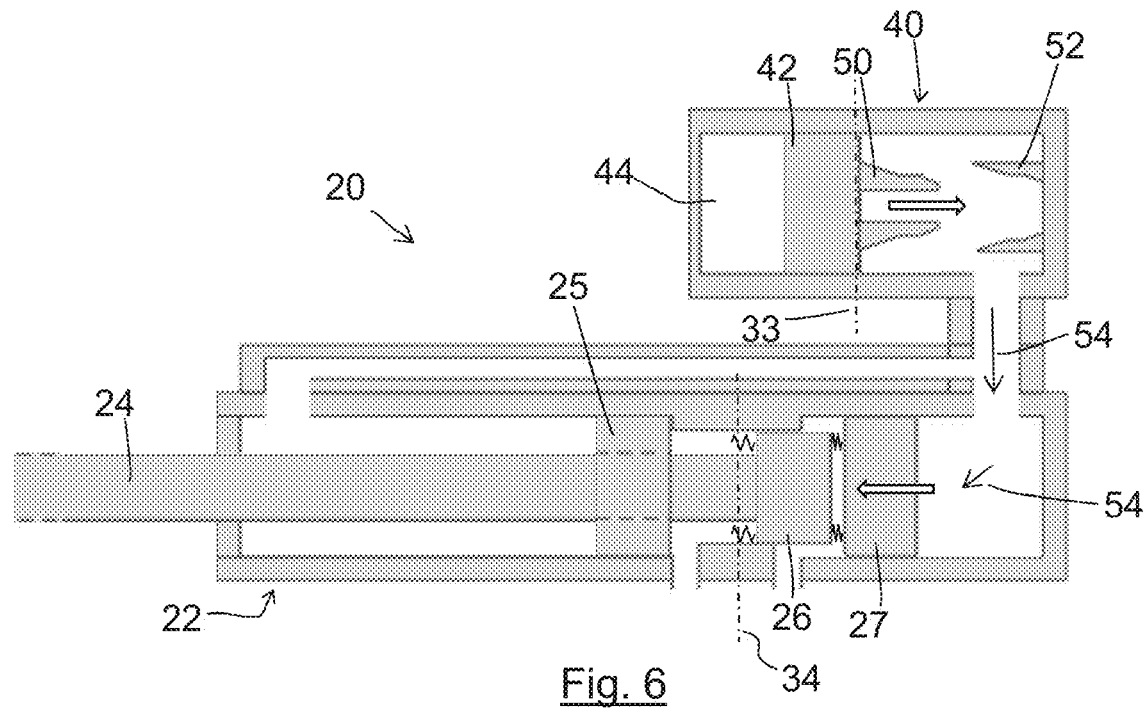
Figure 7:
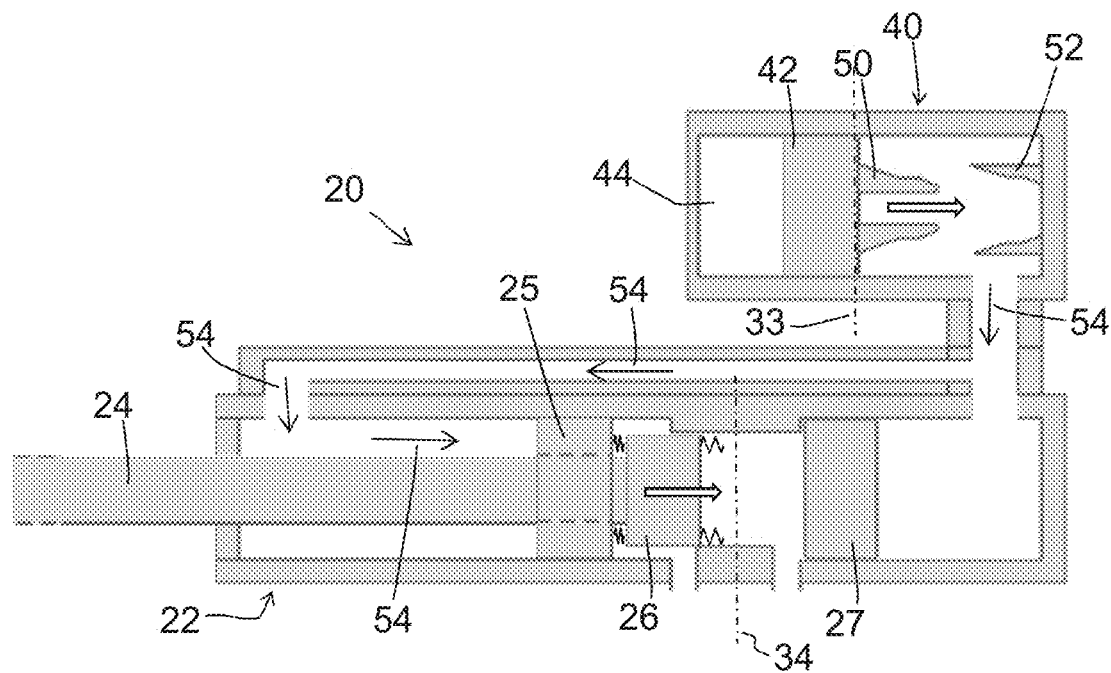

When the actuator is in bias position—shown in FIG. 5—the accumulator 40 is able to accommodate movement of the rod 24 by external forces and return the rod head 26 (and rod) back to its bias position. A movement to the right, forces the right-hand piston head 27 to the right, and the separator piston 42 to the left. The gas in the chamber 44 is compressed. FIG. 6 shows the actuator 20 in this (fault-free) condition. Once the external force acting on the rod 24 is removed/reduced, the separator piston 42 is urged to the right, under the force resulting from the compressed gas in the chamber 44. The flow of hydraulic fluid is indicated by arrows 54. The right-hand piston head 27 is thus urged back towards its original position (moving to the left) which returns the rod head 26 (and rod) back to its bias position. A movement to the left of the rod 24 (from the position shown in FIG. 5), forces the left-hand piston head 25 to the left. As a result of flow of hydraulic fluid through the hydraulic fluid circulation passageway 21, the separator piston 42 is urged to the left. The gas in the chamber 44 is again compressed. FIG. 7 shows the actuator 20 in this (fault-free) condition. Once the external force acting on the rod 24 is removed/reduced, the separator piston 42 is urged to the right, under the force resulting from the compressed gas in the chamber 44. The flow of hydraulic fluid is indicated in FIG. 7 by arrows 54. The left-hand piston head 27 is thus urged back towards its original position (moving to the right) which returns the rod head 26 (and rod) back to its bias position. Thus, in each case, whether there is an external force that moves the rod 24 to the right or an external force that moves the rod 24 to the left, the gas in the single gas chamber 44 is compressed and the separator piston 42 moves to the left.

Figure 8:
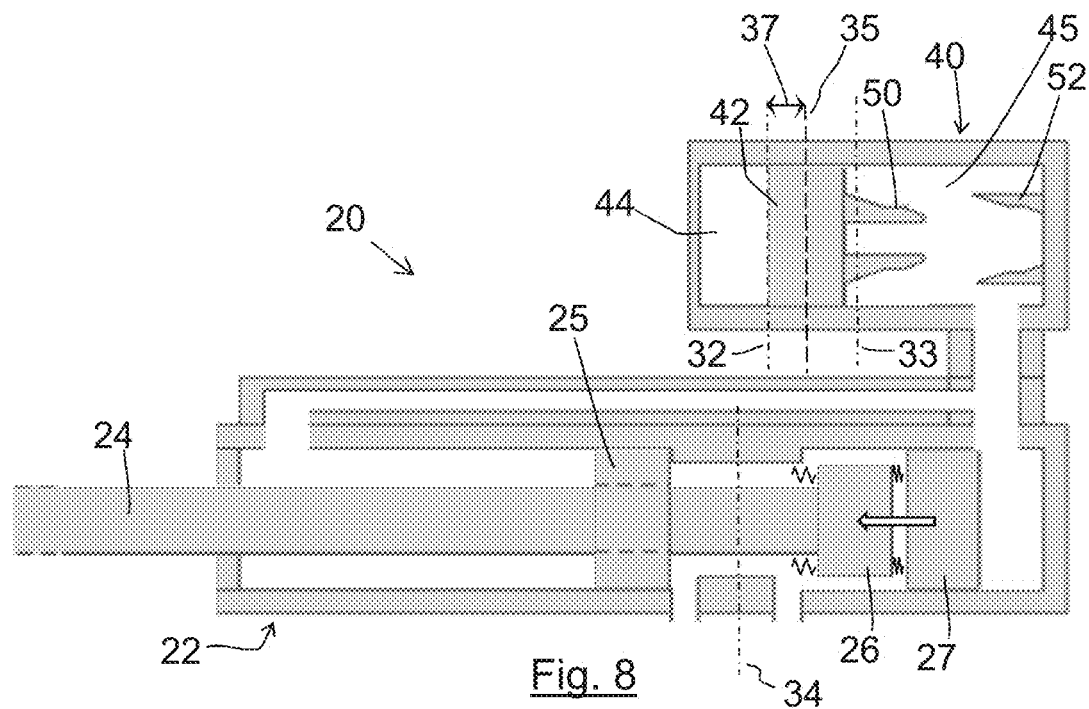

FIG. 8 shows the actuator when in a failure mode and when in the retracted position. As a result of damage to the seal (or another fault in the seal) around the separator piston, the position of the separator piston 42 has migrated from its proper position. This may happen as a result of a fault in the seal (for example, a gap in a part of the seal) allowing gas to go to the fluid side and hydraulic fluid 45 to move to the gas side of the accumulator 40, during operation. A damaged seal may for example cause increased stiction between the piston seal and the accumulator housing wall. This may mean that a higher force is needed to overcome this stiction, causing hydraulic fluid 45 to cross into the gas chamber 44. As a result, the separator piston 42 slowly migrates to the right as fluid is allowed to spill and get trapped on the gas side. It will be noted that damage to the seal, with normal levels of stiction, may in any case mean that there is, depending on where the seal damage is and the orientation of the assembly, a tendency to pull fluid 45 into the gas side (chamber 44) and/or push gas into the fluid side or a tendency to push fluid 45 into the gas side (chamber 44) and/or pull gas into the fluid side; thus causing such migration of the piston 42.

Dotted line 35 in FIG. 8 shows the mid-line of the separator piston 42 at its left-most position (in this failure-mode), with the bogie pitch trimmer actuator 20 fully retracted. It will be seen that the separator piston 42 has drifted to the right by a distance indicated by the double-headed arrow labelled 37 in FIG. 8. While operation of the actuator 20 with a fault like this is still possible (no bottoming out), there is snubbing of the movement to the bias position, which can be detected by the monitoring system 60. The movement to the bias position in the failure mode is shown in FIGS. 9 and 10, which can be compared with and contrasted to the fault-free positions of the actuator as shown in FIGS. 4 and 5, respectively.

Figure 9:
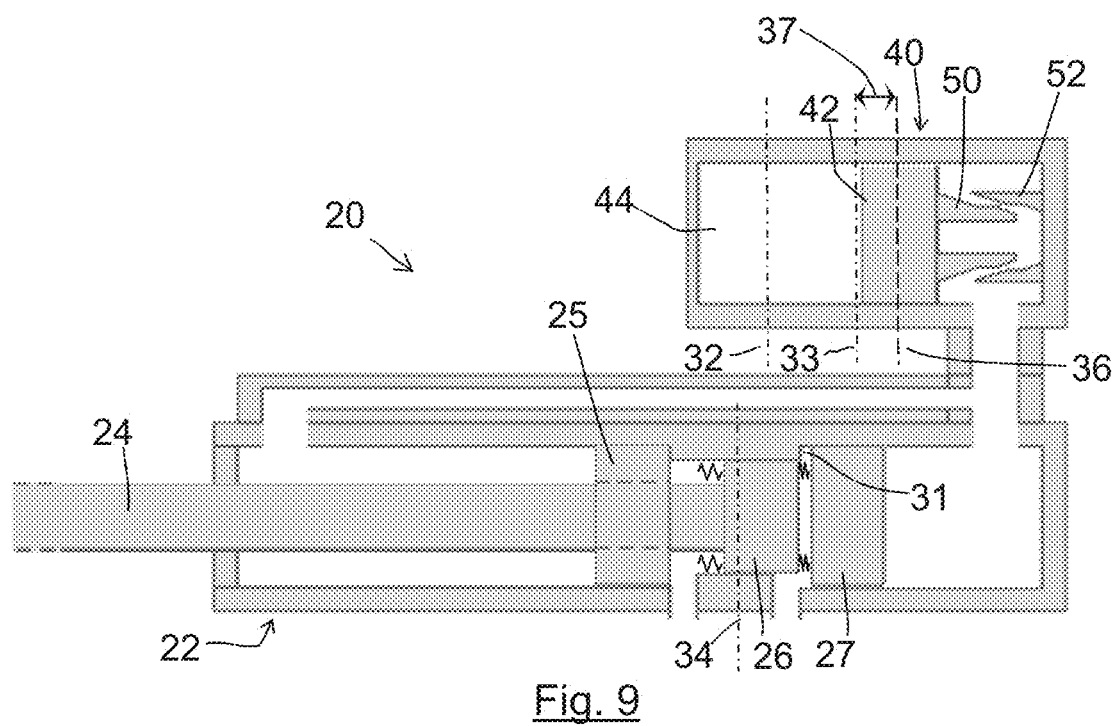
Figure 10:
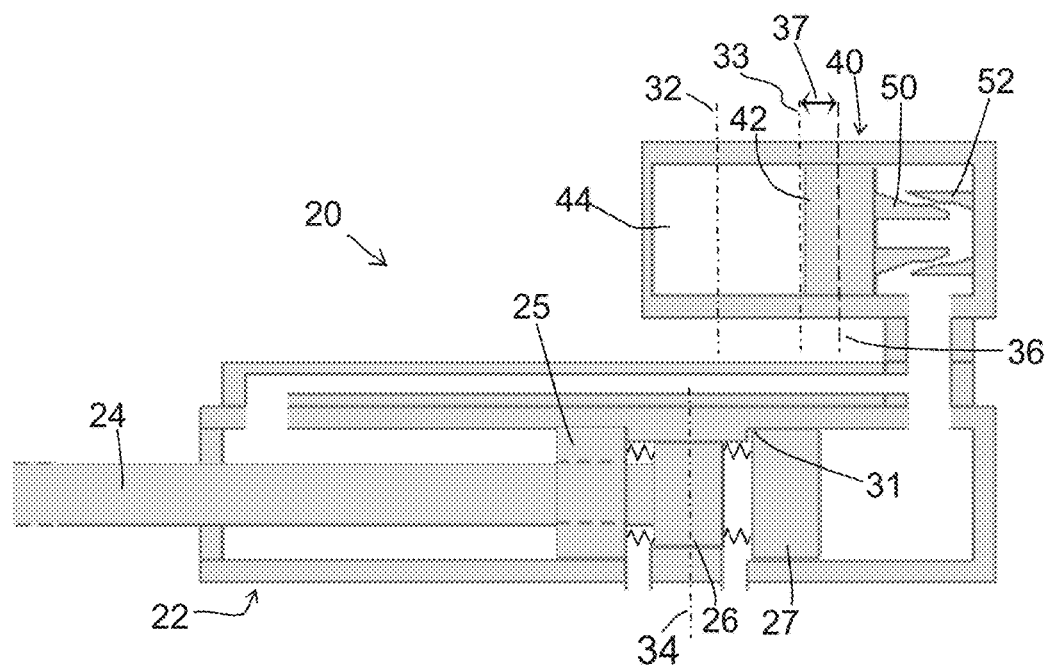

FIG. 9 shows the gas chamber 44 charged with gas, which has urged the separator piston 42 in the accumulator to its (failure-mode) target position. The position of the mid-line of the separator piston 42 at this position is indicated by the dotted line 36 (compare the amount 37 of drift compared to the fault-free position shown by dotted line 33). The movement of the separator piston 42 to the right, causes a corresponding movement of the right-hand piston head 27 to the left, which in turn pushes the rod head 26 and rod 24 to the left. At the bias (target position) the right-hand piston head 27 abuts the right-hand stop 31, as shown in FIG. 10 and the rod-head 26 is positioned midway between the two piston heads 25, 27 and assumes a bias-position much like that shown in FIG. 5. However, in the failure mode, the cups 50 and 52 of the accumulator are sufficiently close that snubbing occurs towards the end of the movement to the bias position. The slowed movement thus makes it clear that the separator piston arrangement is suffering from a failure, which if left to worsen further could risk bottoming out and possible loss of function. The metered cup-cup arrangement constrains the flow of a trapped volume of hydraulic fluid progressively by restricting flow as the separator piston approaches its end of stroke near to the point where bottoming is possible. As mentioned above, no such snubbing occurs when the actuator works in the fault-free condition. It will also be noted that the actuator is able to move from and to the bias position or the retracted position, despite a fault being present in the accumulator.

Figure 11:
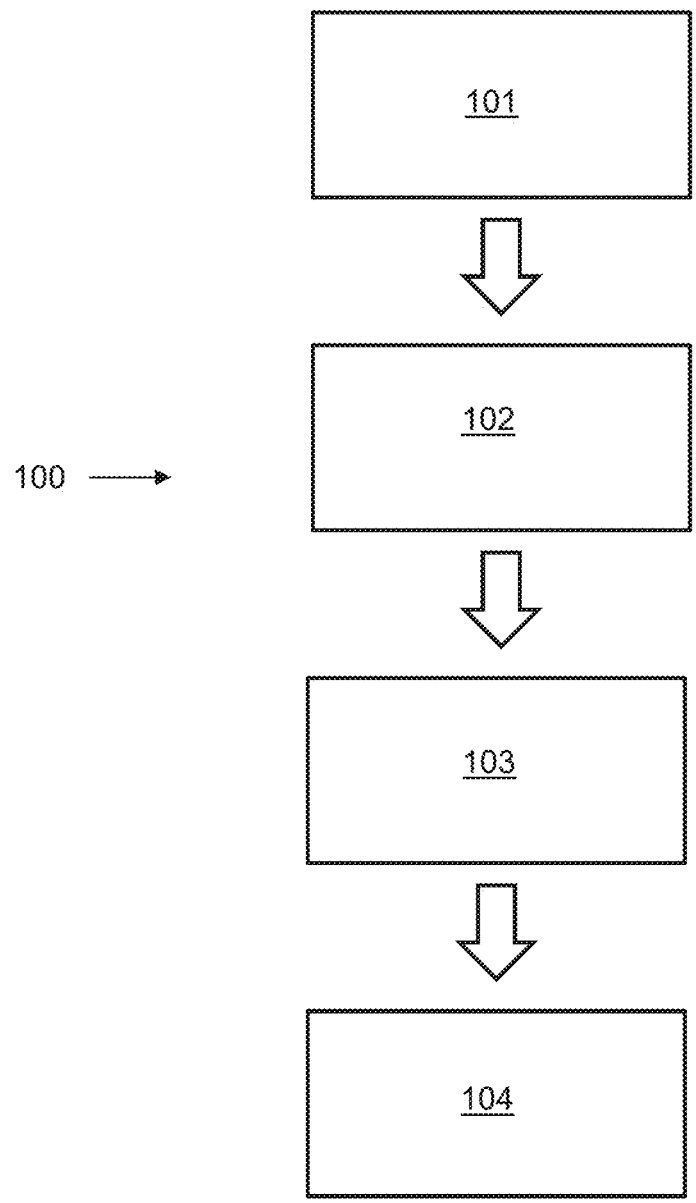
FIG. 11 is a flowchart illustrating the steps of a method of monitoring the operation of a hydraulic actuator/accumulator arrangement of the type of the first embodiment.

FIG. 11 shows a flowchart illustrating a method 100 for detecting a fault in the accumulator of the bogie pitch trimming actuator shown in FIGS. 2 to 10. The steps are carried out by the (programmable) monitoring system under the control of software commands. As a first step 101, the aircraft lifts off (weight off wheels) at time T1, thus releasing the bogie and allowing the bogie position actuator to move from a retracted position to the bias position. The accumulator is charged with gas which causes movement of the actuator. The time, T1, is recorded by the electronic (e.g. computer controlled) monitoring system. At step 102, the time, T2, at which the actuator is detected as having reached the bias position is recorded. At step 103, the difference in times T1 and T2 is calculated which represents the measured time taken for the actuator to move from the retracted position to the bias position. This measured time is compared at step 104 with the expected time, which is a time of the order of a few seconds, but will depend on the particular configuration and set-up in operation. If the measured time is more than a pre-set threshold amount greater than the expected time, the monitoring system deems that there is the possibility of a fault in the accumulator. This is made possible as a result of the snubbing of the movement of the separator piston of the accumulator beyond the position that it would normally reach when the actuator is in the bias position (which in this case is beyond the position indicated by line 33 in FIGS. 8 and 9, for example at the position shown by line 36). The pre-set threshold amount of time extra allowed before a fault is deemed present may itself be of the order of a few seconds, so that for example if the measured time is twice as long as the expected time, a fault may be deemed to be present; whereas if the measured time is only 50% longer than the expected time, that is not sufficient by itself for there to be deemed a fault present.

Figure 12:
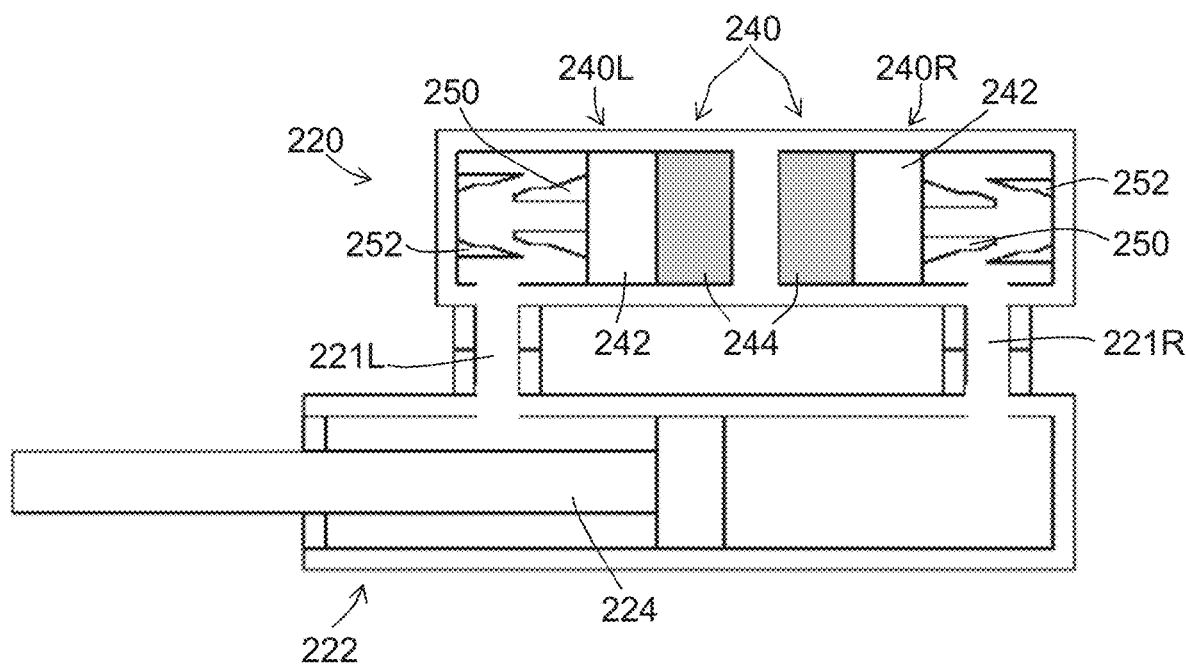
FIG. 12 shows an alternative hydraulic actuator/accumulator for use in a further embodiment similar to that illustrated in FIG. 3.

The embodiment(s) described above with reference to FIGS. 1 to 10 is equally applicable to other types of actuator on the aircraft, both actuators of a structurally different type and actuators used to operate other moving parts on the aircraft. One such actuator is shown by way of example in FIG. 12. The actuator 220 is a bogie pitch trimmer for use on an MLG of an aircraft. However, in this case there are not one, but two, accumulators, namely (with reference to the orientation shown in FIG. 12) a left-hand accumulator 240L and a right-hand accumulator 240R. The actuator 220 also comprises a hydraulic drive unit 222 associated with the accumulators 240. Each accumulator 240 includes a gas chamber 244 for containing a volume of pressurised gas and a separator piston 242. The actuator 220 is shown with the rod 224 in the biased position. The gas-pressurised accumulators 240 are each able to absorb sharp changes in pressure caused by external forces acting on the bogie rod 224. If the rod 224 is urged to the right hydraulic fluid is caused to flow via right hand passageway 221R to cause the separator piston 242 of the right-hand accumulator 240R to move to the left, thereby compressing the gas in the chamber 244 of the right-hand accumulator 240R. If the rod 224 is urged to the left, from the bias position shown in FIG. 12, hydraulic fluid is caused to flow via left-hand passageway 221L to cause the separator piston 242 of the left-hand accumulator 240L to move to the right, thereby compressing the gas in the chamber 244 of the left-hand accumulator 240L. There is thus no need for the "floating" (independently moveable) piston heads of the actuator of FIGS. 2 to 10 or the hydraulic fluid circulation passageway. Each accumulator 240 has snubbing elements, in the form of metered cups 250, 252, which provide a damping effect in a fault-condition, for example when one or both of the two separator pistons 242 has drifted out of position towards the cup 252 on the accumulator housing wall.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In a variation of the actuator shown in FIGS. 2 to 10, the springs on the rod head are not provided and instead, the stops for the left-hand piston head and the right-hand piston head are positioned closer together, so that in the bias position there is very little gap, if any, between the left-hand piston head and the rod head or between the right-hand piston head and the rod head.

It may be the case that the area immediately surrounding the rod head of the actuator shown in FIGS. 2 to 10 is filled with air and sealed so that it does not vent to atmosphere. Such an arrangement could be arranged to assist with creating a return to bias force.

It will be appreciated that a separator piston of the accumulator of the illustrated embodiments may migrate/drift in the opposite direction (in a fault mode)—e.g. in a direction away from the snubbing cup on the accumulator housing wall. While such a fault may cause minor degradation of performance, there is unlikely to be any risk of complete and sudden loss of function of the actuator. It is the case that the monitoring system of the illustrated embodiments may not detect such migration/drift in this direction. However, further snubbing features could be added if detection of such migration/drift in this direction were desired.

In the illustrated embodiments, the pitch trim accumulator separator piston and accumulator housing inner geometry at the end of stroke have geometric features, in the form of metered cups, that act to provide the snubbing effect. Other snubbing approaches are possible of course. For example, there could be provided a protrusion from the separator piston that acts like a gate to reduce the flow area of the in/out port. Springs could be used.

In the illustrated embodiments the time taken for a movement of the actuator is measured by the bogie pitch monitoring system, which may in any case already be provided on an aircraft. As an alternative, the time may effectively be monitored by the landing gear extension and retraction monitoring system, that may already be provided on the aircraft for example. The landing gear extension and retraction monitoring system may for example measure the time taken for a gear retraction operation to be completed. The expected time for this operation to be completed is a time that is of the order of tens of seconds (the exact time will of course depend on the particular configuration and set-up in use). The gear retraction operation includes a phase of moving the bogie into a biased position that enables the landing gear assembly to fold and fit into the landing gear bay of the aircraft. The landing gear extension and retraction monitoring system ensures that the bogie has correctly assumed the biased position before proceeding to fully retract the landing gear assembly. Thus, if the bogie takes longer to move into the biased position than normal, the retraction of the landing gear assembly into the landing gear bay will also take longer than normal. Thus the snubbing that occurs in the fault mode will cause the time measured by the landing gear extension and retraction monitoring system to be longer. If the total time measured is longer than the expected time plus a margin of error of the order of a few seconds, that is deemed by the landing gear extension and retraction monitoring system to be indicative of a fault.

There may be snubbing, for at least some of the movement of the separator piston, during fault-free operation of the actuator.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A landing gear system for an aircraft including
a retractable landing gear assembly,
a hydraulic actuator for actuating movement of at least a part of the landing gear assembly from a first configuration to a second configuration,
an accumulator associated with the actuator, the accumulator comprising a first space for a volume of pressurised gas, and a second space for a volume of hydraulic fluid, the first and second spaces being separated by a separator piston,
and a monitoring system,
wherein
the separator piston is configured to travel to a first stroke limit position during said movement from the first configuration to the second configuration,
travel of the separator piston beyond the first stroke limit position is indicative of a fault,
the accumulator includes a snubbing device that acts to slow movement of the separator piston only once the separator piston has traveled beyond the first stroke limit position, and
the monitoring system is arranged to measure the time taken for movement of said part from the first configuration to the second configuration, and to compare the time taken with a threshold time, such that the measured time being longer than the threshold time is indicative of a possible fault.

2. A landing gear system according to claim 1, wherein the landing gear monitoring system is configured to output an alert signal in the event that the measured time is longer than the threshold time.

3. A landing gear system according to claim 1, wherein the hydraulic actuator is configured for moving a bogie of the landing gear assembly.

4. A landing gear system according to claim 3, wherein the hydraulic actuator is configured to position the bogie into a bias position.

5. A landing gear system according to claim 1, wherein the monitoring system is provided by a landing gear monitoring system which is arranged to measure the time taken for the landing gear assembly to move between a deployed configuration and a retracted configuration.

6. A landing gear system according to claim 4, wherein the monitoring system is provided by a bogie pitch monitoring system which is arranged to measure the time taken for the bogie to be moved from a prior pre-set state to the bias position.

7. A landing gear system according to claim 1, wherein the landing gear system includes one or more sensors that are connected to the monitoring system to enable the monitoring system to detect when the landing gear assembly has moved to the second configuration.

8. A landing gear system according to claim 7, wherein the one or more sensors are located externally of the accumulator.

9. A method of detecting a fault in an accumulator of a landing gear system according to claim 1, the method comprising the following steps:
measuring the time taken for the said part of the landing gear assembly to move between two positions under operation of the hydraulic system including the accumulator, and
in dependence on a comparison between that measured time and an expected time, deeming whether or not there might be a fault in the accumulator.

10. A method according to claim 9, wherein the said part of the landing gear assembly is a bogie.

11. A method according to claim 9, wherein the method includes successfully moving the said part from or to one of either a fully deployed position or a fully retracted position, despite a fault being present in the accumulator, and nevertheless detecting the fault by comparing the measured time and the expected time.

12. A kit of parts comprising a hydraulic actuator, a snubbed accumulator, and a monitoring system, the kit of parts being arranged so as to be suitable for use in converting an aircraft landing gear assembly into a landing gear system according to claim 1.

13. A kit of parts comprising a hydraulic actuator, a snubbed accumulator, and a monitoring system, the kit of parts being arranged so as to be suitable either for use in performing the method of claim 9.

14. An aircraft on which the apparatus of claim 1 has been installed.

15. A monitoring system for use as the monitoring system of claim 1.

16. A monitoring system comprising computer hardware programmed with suitable software for performing the function of the monitoring system of claim 1.

17. A monitoring system comprising computer hardware programmed with suitable software for performing the function of the monitoring method of claim 9.

18. A computer program product configured to cause, when the computer program is executed, computer hardware to perform the function of the monitoring system according to claim 16.

19. An accumulator including a snubbing device, wherein the accumulator is configured for use as the snubbed accumulator of the kit of parts of claim 12.

20. A method of detecting a fault in an accumulator of a hydraulic system associated with a moving part of an aircraft, the accumulator being so configured that there is snubbing of movement of a part of the accumulator beyond the extreme position that accumulator part would reach during movement without such a fault, the method comprising the following steps:
   moving a moving part of the aircraft from or to one of either a fully deployed position or a fully retracted position under operation of the hydraulic system including the accumulator, despite a fault being present in the accumulator,
   measuring the time taken for the moving part of the aircraft to move from or to the one of either the fully deployed position or the fully retracted position, and
   detecting the fault by comparing the measured time and an expected time.

* * * * *